US005743775A

United States Patent [19]
Baurmeister

[11] Patent Number: 5,743,775
[45] Date of Patent: Apr. 28, 1998

[54] LAMINATE FOR RESTRAINING ORGANIC VAPORS, AEROSOLS, AND BIOLOGICAL AGENTS

[75] Inventor: Ulrich Baurmeister, Wuppertal, Germany

[73] Assignee: Akzo Nobel NV, Arnhem, Netherlands

[21] Appl. No.: 521,341

[22] Filed: Aug. 29, 1995

[30] Foreign Application Priority Data

May 22, 1995 [DE] Germany .................. 195 18 683.4

[51] Int. Cl.$^6$ .................................................. B32B 7/00
[52] U.S. Cl. ...................... 442/77; 428/532; 442/76; 442/86; 442/121; 442/122; 442/123; 2/2
[58] Field of Search ........................ 428/532; 442/76, 442/77, 86, 121, 122, 123; 2/2

[56] References Cited

U.S. PATENT DOCUMENTS

| | | | |
|---|---|---|---|
| 3,993,840 | 11/1976 | Tsuji et al. | 428/413 |
| 4,230,463 | 10/1980 | Henis et al. | 55/16 |
| 4,486,202 | 12/1984 | Malon et al. | 55/158 |
| 4,559,139 | 12/1985 | Uemura et al. | 210/490 |
| 4,943,475 | 7/1990 | Baker et al. | 428/246 |
| 4,952,447 | 8/1990 | Phillips et al. | 428/318.6 |
| 4,981,738 | 1/1991 | Farnworth et al. | 428/55 |
| 5,017,424 | 5/1991 | Farnworth et al. | 428/230 |
| 5,024,594 | 6/1991 | Athayde et al. | 428/246 |
| 5,342,469 | 8/1994 | Bodford et al. | 156/244.22 |
| 5,494,720 | 2/1996 | Smith et al. | 428/57 |

FOREIGN PATENT DOCUMENTS

| | | | |
|---|---|---|---|
| 0391660 | 3/1990 | European Pat. Off. | B01D 39/16 |
| WO 90/10424 | 9/1990 | WIPO | A61F 13/00 |
| WO 95/33007 | 12/1995 | WIPO | C08L 75/04 |
| WO 96/37365 | 11/1996 | WIPO | B32B 23/08 |

OTHER PUBLICATIONS

Elias Kelin, et al., Diffusive and Hydraulic Permeabilities of Commercially Available Cellulosic Hemodialysis Films and Hollow Fibers, Journal of Membrane Science, 2(1977) 349–364.

*Primary Examiner*—Terrel Morris
*Attorney, Agent, or Firm*—Joseph M. Noto; Louis A. Morris

[57] ABSTRACT

A laminate that restrains organic vapors, aerosols, and biological agents, where at least one layer is implemented as a barrier layer, wherein the barrier layer is implemented from cellulose-based polymers over its entire surface and the laminate is water-vapor permeable, as well as to the application of the laminate in clothing articles such as work clothing, work safety clothing, military protective clothing, gloves, work shoes, head coverings, and sweat suits, and in construction components for delimiting spaces, tents, emergency shelters, and storage sites for toxic materials is disclosed.

27 Claims, No Drawings

LAMINATE FOR RESTRAINING ORGANIC VAPORS, AEROSOLS, AND BIOLOGICAL AGENTS

CROSS REFERENCE TO RELATED APPLICATIONS

This application claims the benefit of the filing date of prior German Application No. 195 18 683.4-27, filed May 22, 1995, which is incorporated herein by reference in its entirety.

BACKGROUND OF THE INVENTION

1. Field of the Invention

The invention relates to a laminate for restraining organic vapors, aerosols, and biological agents having at least two layers, where at least one layer is implemented as a barrier layer, and the articles made therefrom.

2. Description of the Related Art

For years, attempts have been made to produce laminates, such as for use in clothing articles or as walls in tents, rapid-setup emergency shelters, or rain shelters, that are impermeable to toxic organic vapors and aerosols.

The term organic vapor is understood to include a gaseous state of aggregation a substance passes into by vaporization, evaporation, or sublimation, whereby carbon-tetrachloride or toluene compounds or their breakdown products, and the like, are given as examples for organic vapors that could be toxic under certain conditions.

The term biological agents is understood to include viruses, bacteria, eucaryotes, or plasmids that can at least irritate the user's skin and possibly have a severely inflammatory action on the entire human organism.

Aerosols are understood to be colloidal systems of gases (e.g., air) comprising distributed fine solid or liquid particles (suspended matter) of approx. $10^{-7}$ to $10^{-3}$ cm diameter. Also included herein are similarly dispersed components such as dust or smoke particles, but also mists if in liquid form. These aerosol particles can be electrically charged by dipolar or unipolar diffusion of Klein ions, can result from photoelectric effect or photo dissociation, or be particles produced by electrical discharge. In the form of toxic or pathogenic suspended matter, finely distributed salts, for example of organic toxic compounds such as phenol compounds, cyanates, cyanides, alkaloid compounds, phosphatides, and the like, vapors from industrial exhaust, acid mists from furnaces and automobile exhaust, and coal dust charged with toxic organic compounds can be occluded and can have an inflammatory or possibly lethal effect upon contact with the user's skin.

In the conventional laminates, it has been seen that while clothing articles with a composite laminate, such as disclosed in U.S. Pat. No. 5,017,424, comprising a waterproof, water-vapor-permeable outer layer, an inner layer, and an intermediate layer of activated charcoal as an adsorber layer, provide sufficient protection against organic vapors at least when first exposed, there is the disadvantage that, after saturation of the adsorber layer with the adsorbed organic vapors, the clothing articles become increasingly permeable to organic vapors. Furthermore, these clothing articles have drawbacks to the extent that their reusability is severely restricted because of the limited regenerability, or excessive sensitivity to washing, of the adsorber layer.

Since the thickness of the activated charcoal layer can also be as much as 0.35 cm, the wearing comfort of the clothing articles is limited by their inherent heavy weight and low flexibility.

Even the clothing articles provided with a rubber layer or water-vapor-impermeable layer or layers, as disclosed in U.S. Pat. No. 4,981,738, do not fulfill the requirements of clothing for a high degree of wearing comfort, inherent light weight, or sufficient flexibility. On the contrary, while the clothing articles provided with a rubber layer or water-vapor-impermeable layer do provide excellent impermeability to toxic organic vapors, a high level of moisture is attained between the skin of the wearer and the rubber layer of the clothing article after it is worn for several hours, since the rubber layer prevents transport of moisture released from the user's skin to the outside, so that skin irritations and a high degree of susceptibility to fungus and bacterial infections result. Moreover, the flexibility of the clothing articles provided with rubber is considerably limited in colder climates, since the elasticity of rubber is reduced at low temperatures and the rubber layer tends to become brittle, allowing permeation of organic vapors and aerosols through the clothing articles as a result of tears or cracks.

The clothing articles disclosed in EP A 0 391 660, which have a hydrophobic water-vapor-permeable microporous membrane with a PTFE/nonwoven-fabric layer, are also regenerable and washable only to a limited extent. Even if this embodiment is provided with an adsorptive inner layer, preferably an activated charcoal layer, it may exhibit good adsorption of organic vapors initially, but after saturation of the activated charcoal layer it rapidly develops a permeability to toxic substances when the adsorption capacity is exhausted.

SUMMARY OF THE INVENTION

An aspect of the present invention is to eliminate the aforementioned disadvantages in the prior art. Furthermore, it is desirable for the impermeability of the laminate to be good not only initially but also permanently. Since the laminate is to be used as starting material for clothing articles, which must often be worn for hours at a time, wearing comfort is desirable so that the moisture released from the skin of the wearer can readily escape to the outside, while water is prevented from penetrating when subjected to rain.

Since the clothing articles are not only to be worn by rescue personnel as protective clothing in accidents, such as in chemical manufacturing and processing plants, in research laboratories, or at fires, but since it is also practical and preventive for the laminate to be used, for example, in surgical clothing to protect against viral infection and organic solvents, the laminate must also be characterized by light weight and low manufacturing cost and be sufficiently reusable, washable, and sterilizable.

In accordance with one aspect of the invention, there is provided a laminate for restraining organic vapors, aerosols and biological agents having at least two layers, whereby at least one layer is implemented as a barrier layer, wherein the barrier layer includes cellulose-based polymers implemented over the entire surface thereof and the laminate is permeable to water vapor.

In accordance with another aspect of the invention, the laminate is provided in clothing articles, such as work clothing, work safety clothing, military protective clothing, gloves, work shoes, head coverings, and sweat suits, and in construction components for delimiting spaces, tents, emergency shelters, and storage sites for toxic materials.

These and other aspects of the present invention will become apparent upon a review of the following detailed description and the claims appended thereto.

DETAILED DESCRIPTION OF PREFERRED EMBODIMENTS

The invention relates to a laminate for restraining organic vapors, aerosols, and biological agents having at least two layers, where at least one layer is implemented as a barrier layer, wherein the barrier layer is implemented over the entire surface from cellulose-based polymers and the laminate is permeable to water vapor.

Laminates are understood to be multi-layer molded pieces having at least one carrier layer, where the layers are joined to one another at least at discrete locations. The laminate can also include a carrier layer that provides the laminate of the invention with the desired mechanical properties such as tensile strength, tear propagation resistance, or tear resistance.

Understood to be included herein is any molded piece that has not only a carrier layer but which is coated or saturated with cellulose-based polymers such that at least one side of the carrier layer is covered by these polymers over its entire surface. The term over its entire surface means that the entire surface of at least one side of one layer, for example the carrier layer, is made of these polymers such that defects allowing the permeation of organic vapors, aerosols, and biological agents are not present on the surface of, for example, the carrier layer.

Within the scope of the invention, the term laminate also includes any molded piece in which the barrier layer contains at least one selectively permeable layer as a membrane.

The term membrane is understood to include a film without defects and manufacturable in a separate process.

The barrier layer of the laminate of the invention can also be a microporous filtration membrane whose pores are at least in part filled with the cellulose-based polymers. An important aspect is that the pores are connected to one another via channels over the entire membrane surface and that the channels are also filled with these polymers, and/or the entirety of at least one surface of the membrane is coated with these polymers and the pores of only this surface are at least in part filled with these polymers. Typical examples of microporous filtration membranes are hydrophobic polymers such as polyolefins like polypropylene, polyethylene, polysulfones, poly(ethersulfones), or hydrophilic polymers on the basis of polyamide, polyetheramide, polyether ester, or copolymers thereof. In the case of hydrophobic polymers and one-sided coating, the uncoated side acts as a separation layer.

The term barrier layer within the scope of the invention is understood to be any layer that at least substantially restrains organic vapors, aerosols, and biological agents. The barrier layer can in addition be water-vapor permeable. It can also be implemented as a separation layer and thus have selectively permeable properties.

The term separation layer within the scope of the invention is understood to be any layer that at least substantially prevents the penetration of water in liquid form. This layer is implemented such that it is water-vapor permeable.

It should be noted that the laminate of the invention is impermeable to potentially toxic organic vapors, whereby tetrachloromethane is used as a test substance, for example. As a result of employing the laminate of the invention in clothing articles, for example, in which the laminate contains, for example, at least one layer as a barrier layer, organic vapors can no longer permeate the clothing from the outside, so that no contact of toxic vapors with the wearer's skin takes place.

At least one barrier layer can be manufactured by having one layer be a textile flat structure such as a nonwoven, felt, knit fabric, or woven fabric and by saturating and/or coating this flat structure with cellulose-based polymers. Likewise, the barrier layer can also be implemented as a membrane that can be manufactured using cellulose-based polymers.

The barrier layer or membrane can have a pore distribution that is at least approximately isotropic and/or can be double-layered.

In a further advantageous embodiment of the invention, the laminate exhibits a high degree of water impenetrability, whereby the barrier layer is concurrently implemented as a separation layer and has an ultrafiltration rate of 1 ml/h×m² mm Hg or less, preferably less than 0.1 ml/h×m² mm Hg. The ultrafiltration rate of the laminate of the invention, referred to in literature as "hydraulic permeability", was determined by the method described by E. Klein et al., Journal of Membrane Science, 2 (1977), pp. 349–364, which is incorporated herein by reference in its entirety. It also is shown that the ultrafiltration rate is advantageous in the manufacture of the membrane through reduction of pore fillers such as glycerin. To increase the water impermeability, therefore, the glycerin additive can be reduced to 0.1% to 15% by weight, preferably to 1% by weight, with respect to the weight of the membrane (without glycerin).

It is also of advantage for at least one barrier layer to have at least one separation layer on each side. This arrangement is effective in preventing, among other things, the washing away of the pore filler such as glycerin, PEG (polyethylene glycol), or PVP (polyvinylpyrrolidone), derivatives, or mixtures thereof out of the barrier layer containing cellulose-based polymers, since the separation layers containing polymers on copolyether ester basis are impermeable to glycerin, PVP, and PEG. It is advantageous for the cellulose-based polymers to have an additive of glycerin, PVP, PEG, derivatives, or mixtures thereof under 20% by weight, preferably from 0.1% to 15% by weight, with respect to the weight of the cellulose-based polymers processed into masses for spinning, coating, saturation, or molding, or into a membrane, and the like, for example, with respect to the weight of the membrane. Within the scope of the invention, the weight of the cellulose-based polymers processed into masses for spinning, coating, saturation, or molding, or into a membrane, and the like, is understood to mean the weight of the cellulose-based polymers processed into masses for spinning, coating, saturation, or molding, or into a membrane, and the like, without pore fillers.

Washing away of these pore fillers is also prevented when PEG, PVP, derivatives, or mixtures thereof with a mole mass exceeding 10,000 g/mol are used. Especially preferred is a mole mass of PEG, PVP, derivatives, or mixtures thereof of from 60,000 to 120,000 g/mol. Also preferred is the cross-linking of PVP, PEG, derivatives, or mixtures thereof, in order to avoid the washing away or exudation of these pore fillers during actual use and thereby to control the physical, textile properties of the laminate of the invention such as adhesion, swelling behavior, ultrafiltration, and the like, and to maintain these properties during use.

It is also preferred for the laminate of the invention to have a hydrostatic pressure resistance of $1.3802 \times 10^5$ Pa (20 psi) or above, measured in accordance with FTMS 191A TM 5512.

Likewise, the laminate of the invention can be embodied such that the barrier layer is implemented as an adhesive layer. The adhesive layer in this case includes adhesives containing cellulose-based polymers, which adhesives can restrain organic vapors, aerosols, and biological agents.

In a further embodiment of the invention, it is likewise possible for the laminate to contain at least one layer as a separation layer which is waterproof and water-vapor permeable. The separation layer, for example, in the laminate of the invention can be produced such that the separation layer contains as a membrane polymers on polyether ester basis, preferably copolyether ester basis, polymers on polypropylene basis, and/or polymers on polyetheramide basis. In addition, a membrane, preferably microporous, can be used that includes polymers such as polyolefins, polyethylene/polypropylene copolymers, polyethylene, terephthalates, polycaprolactam, poly(vinylidene fluoride), poly(butylene terephthalate), polyester copolymers, and polytetrafluoroethylene. It is also preferred to coat the microporous membrane or carrier layer, coated on one side with cellulose-based polymers, with polymers acting as a separation layer on the opposite side.

Through saturation, varnishing, or coating of at least one layer of the laminate of the invention, for example the barrier layer, with polymers on polyether ester basis, preferably copolyether ester basis, polymers on polypropylene basis, and/or polymers on polyetheramide basis, a separation layer for separating liquid water can likewise be produced. Suitable in this case are preferably one or more layers of a textile flat structure such as a nonwoven, felt, knit fabric, foamed material and/or woven fabric.

The unwanted penetration of liquid water is additionally prevented by the saturation (impregnation) or coating, conducted in a particular embodiment of the invention, of at least the outer layer and/or the inner layer using hydrophobic agents, preferably permeable to water vapor, so that filling of the space between the separation layer and barrier layer or filling of the carrier layer with water is prevented effectively. As a result, the laminate of the invention can likewise be used for rainwear or as tent fabrics or walls under conditions of heavy rain, in the latter case, for example, to protect chemical storage sites, and the like. The laminate of the invention is thereby also suited as covering or protective sheeting for sensitive equipment, apparatus, machinery, and the like, requiring protection against the aforementioned external effects.

In one embodiment of the invention, the spinning, coating, or molding masses for producing the barrier layer or layers can comprise cellulose-based polymers that can be manufactured using the cuprammonium process. In this process, the solubility of cellulose in a solution of copper oxide and ammonia is exploited. From the copper oxide/ammonia solution, cellulose can be produced as a flat membrane by pressing the solution through spinnerets into aqueous acidic or basic solutions or simply warm water, resulting in flat membranes with a high degree of fineness (registered trademark Cuprophan).

In addition, masses for spinning, coating, or molding can be used to produce the surface-wide barrier layer from cellulose-based polymers by employing, as a solvent for cellulose, copper/ethylenediamine complex solution, xanthate solution, trimethylchlorosilane/$NH_3$/dimethylformamide (DMF) solution, paraformaldehyde/dimethylsulfoxide (DMSO)/N,N-dimethylacetamide (DMAc) solution, $N_2O_4$/dimethylformamide (DMF) solution, dimethylsulfoxide (DMSO) solution, LiCl/dimethylacetamide (DMAc) or N-methylpyrrolidone (NMP) solution, cellulose carbamate solution, $HCOOH/H_3PO_4$ solution, or polyphosphoric acid solution.

Likewise, masses for spinning, coating or molding for producing barrier layers can be provided from cellulose-based polymers producible by using tertiary amine oxide solution as a solvent for cellulose. In this manufacturing process, it is possible to use cellulose-based polymers for a mass for spinning, coating, or molding that contain from 4.99 to 25% by weight cellulose, 95 to 50% by weight of a tertiary amine oxide such as N-methylmorpholine-N-oxide, possibly up to 25% by weight of non-solvent, and up to 10% by weight of other polymers, in each case with respect to the weight of the molding or spinning mass, whereby the molding or spinning mass contains as an additive, individually or in mixture, organic compounds that have at least 4 carbon atoms and at least two conjugated double bonds and at least two groups in the form of hydroxyl and/or amino groups with at least one unsubstituted hydrogen atom, and/or glyceraldehyde.

The manufacture of these cellulose-based polymers can be performed by stirring the cellulose and possibly another polymer in a tertiary amine oxide that contains an additive of the organic compound and possibly up to 25% by weight of a non-solvent, at temperatures between 70° and 190° C., until the cellulose dissolves. The tertiary amine oxides can include any capable of dissolving cellulose and stable with respect to water. Examples are dimethylethanolamine oxide, triethylamine oxide, certain monocyclic N-methylamine-N-oxides such as N-methylmorpholine-N-oxide, N-methylpiperi-dine-N-oxide, N-methylhomopiperidine-N-oxide, N-methyl-pyrrolidine-N-oxide, or other cyclic amine oxides in which the amine oxide group lies outside the ring, such as di-N-methylcyclohexylamine-N-oxide, dimethylhexylamine-N-oxide, and the like.

Organic compounds can comprise pyrocatechol, pyrogallol, gallic acid, gallic acid/methyl./ethyl./propyl, or/isopropyl esters, if the four carbon atoms and the two conjugated double bonds are parts of an aromatic ring system such as a benzene ring, whereby the hydroxyl and/or amino groups can be bound to adjacent carbon atoms.

Organic compounds can comprise hydroquinone, 4(methylamino) phenolsulfate, N-cyclohexyl-N'(2-cyanoethyl)-1,4 phenylenediamine, and N-cyclohexyl-N'-phenyl-1,4 phenylenediamine, if the four carbon atoms and the two conjugated double bonds are parts of an aromatic ring system such as a benzene ring, whereby the hydroxyl and/or amino groups can be bound to carbon atoms 1 and 4.

In a particular embodiment, a layer of the laminate of the invention, for example a woven fabric layer, is coated using extrusion coating, with cellulose-based polymers, and the like, as the coating mass. In the extrusion coating, the coating mass, for example, containing polymers on copolyether ester basis, polypropylene basis, polyurethane basis, and/or polyetheramide basis, is placed in granular form into an extruder, heated, melted, and pressed through a sheeting die. Immediately after leaving the sheeting die, the resulting molten film is pressed and smoothed out by pairs of rollers onto the woven fabric, for example, of the outer layer, the inner layer, and/or the intermediate layer or layers, which can have been heated.

The restraint of organic vapors, aerosols, and biological agents can be effected by saturating a separation layer, for example, as a carrier layer with cellulose-based polymers manufacturable by the cuprammonium process. In a particular embodiment, an advantageous saturation or varnishing of one or more layers is also possible by using vacuum or elevated pressure with the liquid or liquefiable cellulose-based polymers.

In a preferred embodiment, one layer positioned away from the user, i.e., the outer layer, for example a textile woven fabric, is saturated, coated, or laminated as a membrane with cellulose-based polymers, such that a surface-wide barrier layer is produced, and in addition the layer next to the user, i.e., the inner liner layer and a further layer of, for example, a membrane of copolyether ester acting as a separation layer (registered trademark Sympatex), are present. The three-layer laminate is sufficient to fulfill the requirements imposed on the invention. This ensures not only sufficient water impermeability by the separation layer but also, most importantly, a sufficient degree of proofing via the barrier layer and thus restraint of organic vapors, aerosols and biological agents, without having a significant impact on wearing comfort when the laminate is used in clothing articles. In this case, it is seen that the laminate of the invention can be used for clothing articles under the most varied climatic conditions, since it exhibits light weight and adequate elasticity, even at low temperatures. Moreover, no air penetration through the laminate of the invention, in accordance with DIN 53 887, can be detected.

A further embodiment of the laminate of the invention is a four-layer laminate, with one layer implemented as an outer layer of cellulose-based polymers and impermeable to organic vapors, a waterproof, water-vapor-permeable membrane, for example of polymers on copolyether ester basis (registered trademark Sympatex) as an intermediate layer, an inner layer of nonwoven for padding and preventing mechanical damage to the membrane, and a thermostable lining layer.

If one or more layers are used with cellulose-based polymers, it is advantageous to carry out various modifications during manufacture of the membranes, such as surface modification or replacing $SiO_2$ as an antiblocking agent with other compounds, in order to ensure even better adhesion among the layers.

The surface of the layer for reinforcing the effectiveness of the adhesive, or an additional layer, can be surface-activated, for example by a CASING process. In the CASING process (cross-linking by activated species of inert gases), a surface modification can be conducted by a glow discharge in a helium or neon atmosphere, whereby inert gas radicals can be formed that can react readily to attack the surface of the film, membrane, or polymer-coated layer and trigger a modification, for example, a cross-linking.

The membrane or layer so treated can easily be glued to the other layers using conventional adhesives, whereby the membrane area wetted with adhesive can be kept at a low level due to the reinforced bonding of the membrane and the adhesive as a result of the CASING process, for example. As a result, in an advantageous manner, the surface area of the clothing article required for water-vapor permeability from the inside to the outside is not significantly impaired. In a preferred embodiment, however, a pretreatment can be avoided by gluing the cellulosic, selectively permeable membrane with polyurethane adhesive at least on one side to a textile woven fabric or a membrane of or containing polymers on copolyether basis, for example (Sympatex, registered trademark), at least at discrete locations, preferably in a uniform point grid.

The surface treatment process enables the surface of at least one layer to be hydrophobically treated.

Improvement in the adhesion of a layer with a membrane of cellulose-based polymers, for example, can be achieved with plasma polymerization, whereby the plasma polymerization is conducted preferably between 20° and 80° C. The modification of the intermediate layer can also take place using plasma polymerization by producing the plasma using DC or high frequency AC, or by microwaves at pressures between 0.01 and 1 kPa. In coating the outer layer and/or inner layer with the aforementioned polymers, in coating the intermediate layer with these polymers, polymers on copolyether ester basis, cellulose-based polymers producible using the tertiary amine oxide process, or polymers on polyetheramide basis, the plasma polymerization shows that a uniform polymer membrane, polymer layer or coating is formed that is distinguished by excellent adhesive strength. The surface property can be modified such that the abrasion resistance and scratch resistance, and the antistatic properties of the intermediate layer, outer layer, and inner layer, are optimized or modified as required.

It is also seen that the laminate of the invention has only very slight torsional and flexural rigidity, so that the laminate of the invention promotes an agreeable feel for the wearer when used in clothing articles.

By varying the added amounts of glycerin, PEG, PVP, derivatives, or mixtures thereof as pore fillers in the barrier layer made from cellulose-based polymers, for example the inner or outer layer, the water-vapor permeability can also be modified and adapted to suit requirements. For example, the glycerin amount can be from 0.1 to 15% by weight, preferably 1% by weight, with respect to the weight of the membrane (without glycerin).

Likewise, layers of the laminate of the invention, such as the outer layer and/or inner layer, can be made from spun microfibers on polyester, polyamide, acrylic, viscose and/or modal fiber basis, where the spun fiber yarns up to metric count 200 (as ring-spun yarns) or metric count 100 (open-end yarns) made from spun microfibers, in a titer range of 0.6 to 1.3 dtex, preferably 0.6 to 0.8 dtex, can be employed to advantage.

Moreover, it is possible to produce at least one layer with aramid fibers [poly (1,4-phenyleneterephthalamide)], which exhibit a high degree of elongation resistance, strength, and flexibility. It is also advantageous to produce at least one layer from polymers based on an aromatic polyamide with m-phenylenediamine and isophthalic acid, so that the laminate of the invention, due to its high thermal resistance, can be used for fire protection suits, sweatsuits, military protective clothing, and battle or combat dress, in aircraft interiors, filter facilities for industrial exhaust gases, nonflammable seals, barriers, and coatings, and the like.

Furthermore, clothing articles with the laminate of the invention can be dry cleaned without causing permeability to organic vapors, aerosols, or biological agents.

Due to the barrier action of the laminate of the invention against organic vapors, it is suitable for use in tent walls or in covers for sensitive equipment. The laminate of the invention can also be used to advantage as a waterproof, water-vapor-permeable construction component, such as side separation, of spaces, buildings, tents, emergency shelters, auxiliary shelters, thus providing humans, animals, and equipment with protection against toxic vapors, aerosols and biological agents, as well as against water or rain.

It is also possible when using cellulose-based polymers produced using the cuprammonium process to modify adhesion, swelling behavior, level of waterproofing, and the various physical textile characteristics of the laminate of the invention on a large scale and cost effectively, even during manufacture, by varying the concentration and selection of the pore-forming agents or pore fillers, plasticizers such as polyethylene glycols or polyvinylpyrrolidines, thus enabling economical manufacture of the laminate of the invention.

In a further embodiment, at least one layer of the laminate of the invention can contain polymers on copolyether ester basis that are derived from long-chain polyglycols, short-chain glycols with 2 to 4 carbon atoms, and dicarboxylic acids. Preferably, the polymers are copolyether esters including a large number of recurring intralinear long-chain and short-chain ester units that are randomly linked head to tail through ester bonds, where the long-chain ester units correspond to the formula

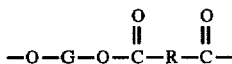

and the short-chain ester units correspond to the formula

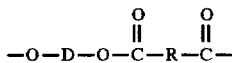

where G represents a divalent fragment remaining after terminal hydroxyl groups are removed from at least one long-chain glycol with a mean molecular weight of 600 to 6000 and an atomic carbon-to-oxygen ratio of between 2.0 and 4.3, where at least 20% by weight of the long-chain glycol has an atomic carbon-to-oxygen ratio between 2.0 and 2.4 and makes up 15 to 50% by weight of the copolyether ester, R represents a divalent fragment remaining after the removal of carboxyl groups from at least one dicarboxylic acid having a molecular weight of less than 300, and D represents a divalent fragment remaining after the removal of hydroxyl groups from at least one diol having a molecular weight of less than 250, where at least 80 mole percent of the dicarboxylic acid is terephthalic acid or its ester-forming equivalents and at least 80 mole percent of the diol having a low molecular weight is 1,4-butanediol or its ester-forming equivalents, the sum of the mole percents of the dicarboxylic acid other than terephthalic acid or its ester-forming equivalents and the diol having a low molecular weight other than 1,4-butanediol or its ester-forming equivalents is no more than 20%, and the short-chain ester units make up from 40–80% by weight of the copolyether ester.

Furthermore, the polymers can be wholly or partly copolyether esters in which at least 70 mole percent of the dicarboxylic acid used is 2,6-naphthalenedicarboxylic acid or its ester-forming equivalents and in which at least 70 mole percent of the diol having a low molecular weight is 1,4-butanediol or its ester-forming equivalents, the sum of the mole percents of the dicarboxylic acid other than 2,6-naphthalenedicarboxylic acid or its ester-forming equivalents and of the diol having a low molecular weight other than 1,4-butanediol or its ester-forming equivalents is no more than 30%, and the ester units with short chains make up 35 to 80% by weight of the copolyether ester.

Likewise, the polymers can be copolyether esters which include of a large number of recurring intralinear long-chain and short-chain ester units that are linked randomly head to tail by ester bonds, where the long-chain ester units correspond to the formula

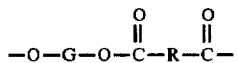

and the short-chain ester units correspond to the formula

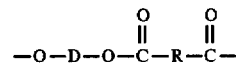

where G represents a divalent fragment remaining after terminal hydroxyl groups are removed from at least one long-chain glycol with a mean molecular weight of 600 to 4000 and an atomic carbon-to-oxygen ratio of between 2 and 4.3, where at least 20% by weight of the long-chain glycol has an atomic carbon-to-oxygen ratio of between 2.0 and 2.4 and makes up 15 to 50% by weight of the copolyether ester, R represents a divalent fragment remaining after the removal of carboxyl groups from at least one dicarboxylic acid with a molecular weight of less than 300, and D represents a divalent fragment remaining after the removal of hydroxyl groups from at least one diol having a molecular weight of less than 250, where at least 70 mole percent of the dicarboxylic acid is 2,6-naphthalenedicarboxylic acid or its ester-forming equivalents and at least 70 mole percent of the diol having a low molecular weight is 1,4-butanediol or its ester-forming equivalents, the sum of the mole percents of the dicarboxylic acid other than 2,6-naphthalenedicarboxylic acid or its ester-forming equivalents and the diol having a low molecular weight other than 1,4-butanediol or its ester-forming equivalents is no more than 30%, and the short-chain ester units make up from 35 to 80% by weight of the copolyether ester.

In one embodiment of the laminate of the invention including a layer, made from cellulose-based polymers, between the outer and inner layers, i.e., an intermediate layer, it is advantageous for the outer layer and/or the inner layer to be saturated and/or coated with a hydrophobic agent. In the case of saturation (impregnation) or coating of the outer layer of the laminate of the invention, the pores formed by the weave are not sealed but rather remain breathable and water-vapor permeable. Suitable hydrophobic agents are paraffins, waxes, or metal soaps which can contain additives of aluminum or zirconium salts, quaternary organic compounds, urea derivatives, fatty-acid-modified melamine resins, chromium complex salts, silicones, organotin compounds, glutaraldehyde, and the like.

Particularly suitable as silicones are unmodified methylpolysiloxanes or modified methylpolysiloxanes such as those that are singly or doubly side-chain modified, end-group modified, and/or side- and end-group modified. As a result of the impregnation and/or coating, the fiber surface of the outer layer is modified such that water drops bead off the outer layer without wetting the woven fabric of the outer layer or penetrating it. Furthermore, the impregnation or coating of the outer layer has the advantage of being dirt repellent.

In a further embodiment of the invention, intermediate layers of different membranes and/or impregnated or coated woven fabrics, nonwovens, felts, and the like, can be employed, whereby one membrane can contain a cellulose-based polymer producible using the cuprammonium process, and, for example, an additional membrane can contain a polymer obtained from tertiary amine oxide processes or a polymer on copolyether ester basis.

The intermediate layers adjacent to the outer layer and/or inner layer can be bonded with an adhesive, preferably a water-vapor-permeable and waterproof adhesive, at least at discrete locations, such as pointwise, in a grid pattern, in lines and/or in strips. Preferably, a thermal adhesive process can follow. Suitable adhesives are conventional disperse adhesives, solvent adhesives, rapid-setting adhesives, or two-component adhesives. Disperse adhesives employed can be aqueous emulsions of plastics, or natural or synthetic rubber, as well as dispersions of organic polymers.

A particular advantage is the use of adhesives on polyurethane basis having a slight swelling capability and exhibiting maximum laminate adhesion and adhesive force when the laminate of the invention, contaminated with toxic vapors, aerosols, or viruses, must be subjected to a chemical or aqueous mechanical washing cycle. Suitable waterproof and water-vapor-permeable adhesives are those with cellulose-based polymers.

Likewise, thermal or steam sterilization of the laminate of the invention does not lead to any significant shape instability in clothing articles manufactured from the laminate of the invention. In contrast to the prior art, a functional limitation such as deformation of the clothing articles, which can impair their wearing comfort or their protection against organic vapors and aerosols, has not been observed.

It is also possible to manufacture clothing articles such that the intermediate layer is usable in the form of an insert using a dipping process and possibly fixable to the outer layer using a hot-melt process. This permits comprehensive insulation of the user toward the outside via the clothing article.

In an additional embodiment, the laminate of the invention can also have a temperature-reducing insulating layer that can be vapor deposited as a water-vapor permeable, preferably porous, temperature-reducing insulation layer on the side of the inner layer positioned toward the outside.

It is of advantage for the outer layer and/or the inner layer to have a thickness of 80 to 300 µm, preferably 150 to 250 µm. In this case, the layer with cellulose-based polymers is 2 to 20 µm thick, preferably 8 µm, and the layer with polymers on, for example, copolyether ester basis is 5 to 20 µm, preferably 10 µm. Even more advantageously, the layer with cellulose-based polymers can have a thickness of 6.5, 8, 11, or 16 µm. In particular, this is possible if the intermediate layer has a weight per unit area of 10 to 200 $g/m^2$, preferably 12 to 15 $g/m^2$. In one embodiment of the invention, the water-vapor penetration rate of the intermediate layer exceeds 600 $g/m^2$ per 24 hours, preferably 600 to 900 $g/m^2$ per 24 hours (in accordance with ASTM E 96-93).

Furthermore, natural and/or chemical fibers are used for the nonwoven, felt, and/or the woven fabric of the laminate of the invention. Suitable natural fibers are cotton, linen, jute, hemp, and/or sisal. Suitable chemical fibers are synthetic fibers and/or regenerated and/or modified cellulose fibers. The synthetic fibers comprise at least one representative of the group including polyester, polyamide, polyacrylic, or polyvinylchloride fibers, or blends thereof.

An additional subject of the invention relates to the use of the laminate of the invention in waterproof, water-vapor-permeable clothing articles and coverings as well as for separation and/or restraint of toxic vapors, aerosols, and biological agents in substance exchangers, for example.

Due to the excellent properties of the laminate of the invention, the laminate can be used not only as starting material for manufacturing clothing articles such as work clothing, work safety clothing, gloves, work shoes, head coverings, combat dress, or sweatsuits, but it is also excellently suited wherever penetration of water vapor is desired but penetration of organic vapors, aerosols, or liquid water is not wanted. For this reason, the laminate of the invention can be used as a protective laminate in filters for industrial exhaust gases, protective covers, tent walls, and as covering/protective laminates for sensitive technical devices or apparatus.

The invention will be further illustrated with reference to the following specific examples. It is understood that these examples are given by way of illustration and are not meant to limit the disclosure or the claims to follow.

EXAMPLES

In the examples the laminate of the invention is subjected to tetrachloromethane vapor and water vapor in accordance with testing procedure ASTM E 96-93 (Method B, modified). Here, circular-shaped laminate pieces are arranged on the rim of a vessel containing tetrachloromethane or water and the vessel is hermetically sealed. Within the vessel, the relative humidity is 100%. Outside the vessel, the relative humidity is 60%. The air temperature is 21° C., the wind speed is 2 m/s. The temperature of the liquid in the vessel is 21° C. or 30° C., depending on the trial. The distance of the test laminate from the surface of the liquid in the vessel is 2.5 cm.

Example I

The membrane used as the barrier layer of the laminate, containing a cellulose-based polymer produced by the cuprammonium process (registered trademark Cuprophan), is 8 µm thick and has an ultrafiltration rate of 4.2 ml/h×$m^2$ mm Hg. A water-vapor permeability of the laminate of the invention of 3,100 $g/m^2$ per 24 hours is attained at a water temperature of 30° C. At a water temperature of 21° C., the water-vapor permeability is reduced to 600 $g/m^2$ per 24 hours. Furthermore, at a tetrachloromethane temperature of 21° C., no permeability to tetrachloromethane vapor can be detected. The laminate has a hydrostatic pressure resistance of 41.5 psi as per FTMS 191A, TM 5512. Repeat measurements after 1 and 2 months show no significant change in these data.

Comparative Example A

As a verification step, comparison using a conventional laminate containing not a cellulose-based polymer produced by the cuprammonium process but rather one only on polyester basis (registered trademark Sympatex) shows a water-vapor permeability of 2,700 $g/m^2$ per 24 hours at a water temperature of 30° C. and a water-vapor permeability of 750 $g/m^2$ per 24 hours at a water temperature of 21° C. In contrast to the laminate of the invention, which contains a membrane as an intermediate layer (registered trademark Cuprophan), a tetrachloromethane permeability of 2,900 $g/m^2$ per 24 hours is observed.

Example II

In using the laminate of the invention containing two membranes, one with a thickness of 8 µm, made from a cellulose-based polymer produced by the cuprammonium process (registered trademark Cuprophan) and having an ultrafiltration rate of 4.2 ml/h×$m^2$ mm Hg, and the second membrane on copolyether ester basis as a separation layer, with a thickness of 10 µm (registered trademark Sympatex), the water-vapor permeability of the test laminate of the invention is shown to be approximately 600 $g/m^2$ per 24 hours at a water temperature in the vessel of 21° C., whereby raising the temperature of the water in the vessel raises the water-vapor permeability fourfold, as in Example I. Permeability of the sample for tetrachloromethane vapor is also not detectable in this case.

The laminate exhibits a hydrostatic pressure resistance of 39.6 psi, achieved through the upper and lower woven fabrics, between which the two membranes are laminated.

Example III

An 8 µm thick cellulosic membrane (registered trademark Cuprophan), a 10 µm membrane on copolyether ester basis, and a tricot woven fabric made from nylon-6 are laminated and subjected to a hydrophobic aftertreatment. The water-vapor permeability is 590 g/m² per 24 hours. The ultrafiltration rate of the laminate, with the higher pressure on the side of the hydrophobically treated woven fabric, is zero. The water-vapor permeability is 2,753 g/m² per 24 hours. The weight per unit area of the laminate is 143.4 g/m².

While the invention has been described with preferred embodiments, it is to be understood that variations and modifications are to be considered within the purview and the scope of the claims appended hereto.

What is claimed is;

1. A laminate for restraining organic vapors, aerosols and biological agents which is permeable to water vapor comprising at least three layers, wherein at least one layer is a barrier layer comprising cellulose-based polymers over the entire surface thereof which is permeable to water vapor and which restrains organic vapors, aerosols, and biological agents and wherein at least two layers are separation layers which substantially prevent the penetration of water in liquid form, but which are water-vapor permeable, at least one of said separation layers being on each side of said barrier layer.

2. The laminate in accordance with claim 1, wherein at least one layer is a textile flat structure.

3. The laminate in accordance with claim 1, wherein said barrier is producible by saturating and/or coating a layer making up said laminate with cellulose-based polymers.

4. The laminate in accordance with claim 1, wherein at least one of said separation layers comprises copolyether ester based polymers.

5. The laminate in accordance with claim 1, wherein said barrier layer has an ultrafiltration rate equal to or less than 1 ml/h×m² mm Hg.

6. The laminate in accordance with claim 4, wherein at least one of said separation layers is producible by saturating and/or coating a layer making up said laminate with copolyether ester based polymers.

7. The laminate in accordance with claim 1, wherein said barrier layer is an adhesive.

8. The laminate in accordance with claim 1, wherein said barrier layer is a membrane.

9. The laminate in accordance with claim 1, wherein at least one of said separation layers comprises a membrane.

10. The laminate in accordance with claim 9, wherein at least one of said separation layers is a microporous hydrophobic membrane.

11. The laminate in accordance with claim 1, wherein said laminate has a hydrostatic pressure resistance equal to or greater than $1.3802 \times 10^5$ Pa (20 psi).

12. The laminate in accordance with claim 1, wherein at least one of said separation layers is double-layered.

13. The laminate in accordance with claim 1, wherein said at least one layer is saturated and/or coated with a water-vapor-permeable hydrophobic agent.

14. The laminate in accordance with claim 1, wherein a mass for spinning, coating, or molding to produce said barrier layer contains cellulose-based polymers producible using copper oxide/ammonia solution, copper/ethylenediamine complex solution, or xanthate solution as a solvent for cellulose.

15. The laminate in accordance with claim 1, wherein a mass for spinning, coating, or molding to produce said barrier layer contains cellulose-based polymers producible using tertiary amine oxide solution as a solvent for cellulose.

16. The laminate in accordance with claim 15, wherein said mass for spinning, coating, or molding comprises cellulose-based polymers containing from 4.99 to 25% by weight cellulose, from 95 to 50% by weight of a tertiary amine oxide, up to 25% by weight of a non-solvent for said cellulose-based polymers, in each case with respect to the weight of said molding or spinning mass, and organic compounds as additives that have at least 4 carbon atoms and at least two conjugated double bonds and at least two groups in the form of hydroxyl and/or amino groups with at least one unsubstituted hydrogen atom, and/or glyceraldehyde, individually or in mixture.

17. The laminate in accordance with claim 1, wherein said cellulose-based polymers comprise an additive of glycerin, PEG, PVP, derivatives, or mixtures thereof, of less than 20% by weight with respect to the weight of said cellulose-based polymers.

18. The laminate in accordance with claim 17, wherein said additive is from 0.1 to 15% by weight with respect to the weight of said cellulose-based polymers.

19. The laminate in accordance with claim 18, wherein said PEG, PVP, derivatives, or mixtures thereof have a mole mass of greater than 10.000 g/mol.

20. The laminate in accordance with claim 19, wherein said the mole mass of PEG, PVP, derivatives or mixtures thereof is from 60,000 to 120,000 g/mol.

21. The laminate in accordance with claim 17, wherein said PEG, PVP, derivatives, or mixtures thereof are cross-linked.

22. The laminate in accordance with claim 4, wherein said copolyether ester based polymers are copolyether esters derived from long-chain polyglycols, short-chain glycols having from 2 to 4 carbon atoms, and dicarboxylic acids.

23. The laminate in accordance with claim 1, wherein one or more layers are glued to one another at least at discrete locations using an adhesive.

24. The laminate in accordance with claim 23, wherein said adhesive is water-vapor permeable and/or impermeable to organic vapors, aerosols, and biological agents.

25. The laminate in accordance with claim 23, wherein more than two layers are glued to one another at discrete locations and said discrete locations are superimposed.

26. Articles of clothing being waterproof and providing water-vapor-permeable protection against toxic vapors, aerosols, and biological agents, wherein said articles of clothing contain said laminate in accordance with claim 1.

27. Articles of clothing in accordance with claim 26, wherein said articles of clothing are work clothing, work safety clothing, military protective clothing, gloves, work shoes, head coverings, or sweatsuits.

* * * * *